(12) United States Patent
Gelbwachs

(10) Patent No.: US 6,281,969 B1
(45) Date of Patent: Aug. 28, 2001

(54) CLOUD BASE MEASUREMENT METHOD

(75) Inventor: Jerry A. Gelbwachs, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/428,039

(22) Filed: Oct. 27, 1999

(51) Int. Cl.[7] .............................. G01C 3/08; G01N 21/00

(52) U.S. Cl. ........................ 356/5.01; 356/5.08; 356/342

(58) Field of Search .................................. 356/5.01–5.08, 356/4.01

(56) References Cited

U.S. PATENT DOCUMENTS 4,828,382 * 5/1989 Vermilion .

* cited by examiner

Primary Examiner—Stephen C. Buczinski
(74) Attorney, Agent, or Firm—Derrick Michael Reid

(57) ABSTRACT

A high altitude lidar system propagates a beam of laser pulses through clearings in a cloud formation which reflects off the surface of the earth thereby providing first earth surface returns and reflections towards the base of a cloud that again reflects the pulses back towards the earth surface to be reflected again to provide cloud base returns. The time differential between the earth surface returns and the cloud base returns are used to determine the altitude of the base of the cloud.

3 Claims, 3 Drawing Sheets

OPTICAL CLOUD BASE ALTITUDE MEASUREMENT

OPTICAL CLOUD BASE ALTITUDE MEASUREMENT

REFLECTION TIME SEQUENCE

CLOUD BASE AND THICKNESS DETERMINATION METHOD

CLOUD BASE MEASUREMENT METHOD

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of meteorology. More particularly the present invention relates to laser measurement of cloud base altitudes.

BACKGROUND OF THE INVENTION

There has been a long felt need for the capability to measure the base altitudes of one to three kilometers thick clouds as viewed from above. Conventional space-based lidar methods measure cloud depths by direct transmission of a laser beam through the cloud and sensing the backscattered returns. These techniques are limited by severe optical scattering by cloud particles to thickness less than 500 meters. Meteorological satellite images and Shuttle lidar data reveal transparent spaces even under dense cloud conditions. Representative albedos are diffuse reflectivities for cloud and surface features and are well known data from satellite meteorological measurements. Clouds are classified in various forms. Cumulonimbus clouds are thick and large with a 92% albedo. Stratus clouds are thick and usually over an ocean with a 64% albedo. Cirrus clouds are isolated clouds over land with a 36% albedo. Land features are also classified in various forms. Light sand including white sands has a 60% alebdo. Dark sands including sands in valleys, plains and slopes have a 27% albedo. Snow has a 59% albedo. Arctic summer ice has a 50% albedo. Coniferous forests have a 12% albedo. Oceans have a 7% albedo.

Current methods involve the propagation of a lidar beam from space through the full depth of the cloud. The strong backscattered radiation from the cloud aerosols indicates the presence of the cloud. A sharp drop off in the signal returns would signify the cloud bottom. Two problems exist with the conventional approach. The first problem is that thick clouds strongly attenuate light. Representative round-trip cloud extinctions are between 200 to 1000 dB per km. The second problem is multiple scattering from the cloud aerosols. This effect produces pulse stretching that prevents delineation of the sharp cloud bottom. These and other disadvantages are solved or reduced using the present invention.

SUMMARY OF THE INVENTION

An object of the invention is to provide a method for determining the altitude of the base of a cloud when viewed from above.

Another object of the invention is to provide a method for determining the altitude of the base of cloud by laser beam illumination through a clearing in a cloud formation and sensing returns through the clearing.

Another object of the invention is to provide a method for determining the altitude of the base of a cloud by laser beam illumination through a clearing in a cloud formation for a first reflection off the surface of the earth, a second reflection off the bottom base of the cloud, and a third reflection again off the surface and the earth, and sensing returns through the clearing.

The present invention is directed to a high altitude or space-based lidar method for the measurement of the altitude of a cloud base that is not restricted by cloud attenuation. The method relies upon cloud porosity and diffuse reflections from land or water features to sense cloud base bottoms from below. A lidar measurement system generates a beam of laser pulses that is communicated through a clearing in the cloud formation towards the surface of the earth. The beam first diffusely reflects off the earth surface to thereby scatter the beam. Some of the diffusely reflected laser light returns to the lidar system and can be sensed. A first portion of the scattered reflections is directed to a near by cloud formation. The first portion of scattered reflections is reflected off a cloud base of the cloud formation thereby creating a second portion of scattered returns. The second portion of the scattered returns is reflected back down towards the surface of the earth. The second portion of scattered reflections is again reflected off the surface of the earth creating a third portion of scattered reflected light that is returned to the measuring lidar system. The lidar system senses returns from the first and second reflections off the surface of the earth. The time differential between the first and second returns is used to compute the altitude of the cloud base. These and other advantages will become more apparent from the following detailed description of the preferred embodiment.

DETAILED DESCRIPTION OF THE PREFERRED EMBODIMENT

Figure 1:
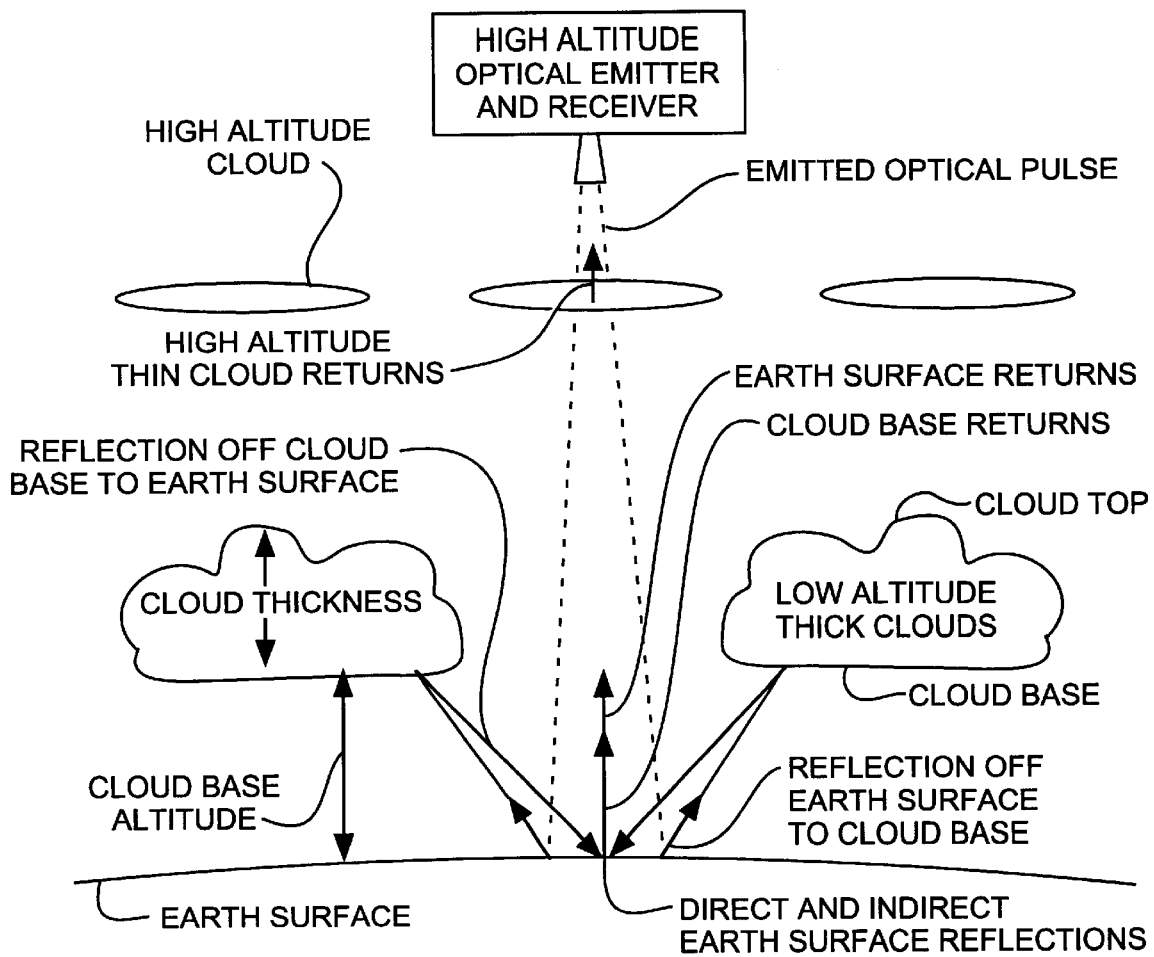
FIG. 1 depicts a high altitude optical emitter illuminating a cloud base.
Figure 2:
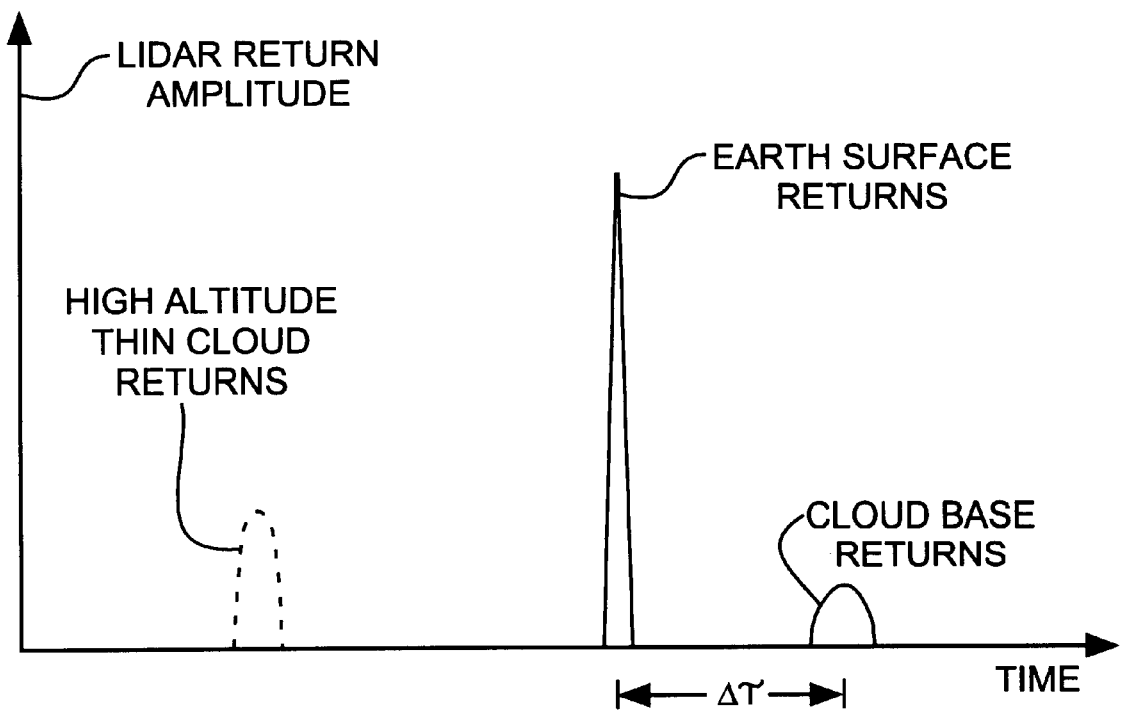
FIG. 2 is a reflection time sequence graph showing lidar returns.
Figure 3:
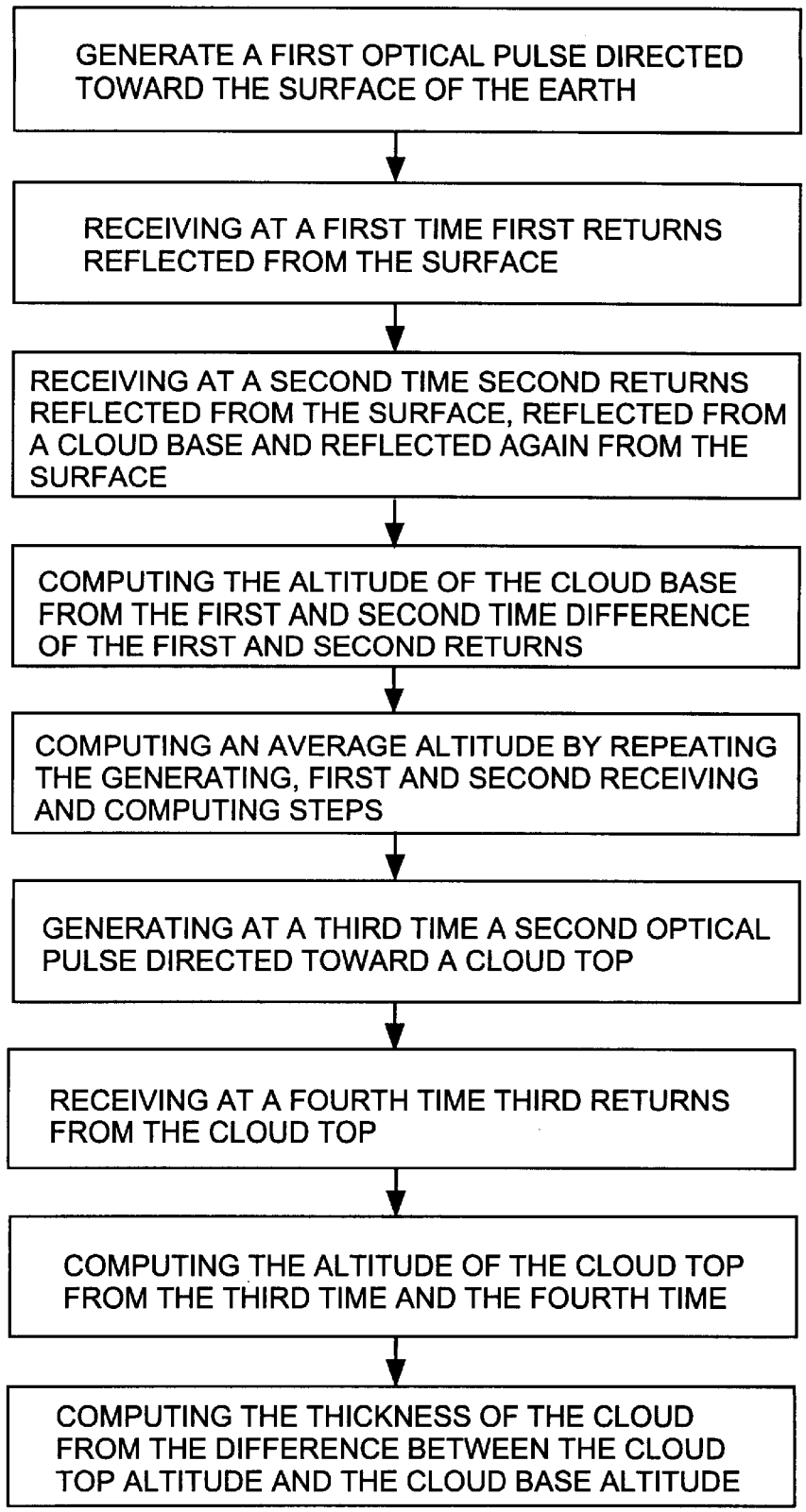
FIG. 3 is a flow diagram of the cloud base determination method.

An embodiment of the invention is described with reference to the figures. Referring to the figures, the method is used to determine the altitude of the base of a cloud. The lidar method preferably senses cloud bottoms from space, but high altitude systems could be deployed and used as well. The method relies upon the natural porosity of cloud layers and the diffusive reflectance of earth surface features. A lidar system includes both an optical emitter and a receiver. A high altitude optical emitter emits a series of optical pulses through a cloud clearing towards the earth. In an area of thick clouds, most of the laser pulses intercept the clouds and produce no useful returns. A fraction of the pulses pass through clear spaces, that is the cloud pores, between the clouds, and intercept the surface of the earth. The surface of the earth directly reflects a portion of the laser light series of pulses back to the lidar system as earth surface returns. The diffuse reflectance of the surface features cause reflections as a wide-angle mirror and reflects the incident light upwards towards the cloud layer. A portion of the reflected light will be diffusely reflected from the cloud bottoms providing reflections back toward the surface of the earth. Some of the reflected laser light pulses will be reflected off the surface of the earth to retrace a path back up to the lidar system as an indirect reflection to provide cloud base returns sensed by the receiver of the lidar system. The lidar system has a conventional receiver and detection means for sensing the earth surface returns and the cloud base returns for determining the time differential between the earth surface returns and cloud base returns for computing the altitude of the base of the cloud.

The laser pulses may be passed through thin high altitude clouds in the upper atmosphere. Typically, the pulses can propagate through these high altitude clouds with low attenuation of the laser pulses. The lidar pulses then intercept the surface of the earth to produce the earth surface returns typically sensed with a sharp return profile. The reflected pulses are then reflected by diffuse reflection from the underside, that is the base, of the cloud layer. The cloud base returns are diffuse returns having a wide return profile. The time delay between the sharp earth surface return and the wide cloud base returns is related directly to the cloud base altitude by the usual time-of-flight expression. Like other forms of altimetry, the absolute magnitude of the returns is not critical provided that the signal exceeds the detection threshold. It is the time-of-flight only that determines the cloud base altitude. Hence, the method can accommodate the natural albedo variability of the scattered diffuse returns.

The anticipated signal levels for the lidar system can be calculated. An expression for the anticipated return signal for a space-based lidar can be derived as a return signal equation, $S=(E/h\upsilon)(B_s/\pi)(\Omega_u)(fB_c/\pi)(\Omega_d)(B_s/\pi)(A_r/R^2)(\tau_a)(\tau_o)(\eta)$. The term E is the lidar transmitter energy per pulse, $h\upsilon$ is the photon energy, $B_s$ is the surface albedo, $\Omega_u$ is the upward-viewing solid angle intercepted by the cloud bottom, f is the fraction of the upward solid-angle filled by the cloud, $B_c$ is the cloud albedo, $\Omega_d$ is the downward-viewing solid angle from the cloud bottom subtended by the projection of the satellite field-of-view onto the surface of the earth, $A_r$ is the receiver aperture area, R is the range to the surface of the earth, $\tau_a$ is the round-trip atmospheric transmission, $\tau_o$ is the transmission of receiver optics, and $\eta$ is the photomultiplier quantum efficiency.

The return signal equation uses an approximation that the diffuse reflectances from the clouds and the earth surface features can be modeled as ideal Lambertian surfaces. Known cloud albedos will vary by a factor of three while surface feature reflectances can vary over an order of magnitude. The return signal equation indicates that the signal levels vary directly as $B_c \times B_s^2$. Hence, the received signals will be highly sensitive to surface albedo and weakly dependent upon cloud type. Nominal values for space-based lidar can be used to obtain estimates of the signal levels that might be expected with the method. With the lidar system operating with a frequency-doubled Nd:YAG laser at 532 nm, nominal lidar parameters can be computed, such as with E=1 Joule per pulse; $A_r=1$ m$^2$; R=1000 km; $\tau_a=0.5$; $\tau_o=0.8$; $\eta=0.15\%$. Furthermore, with $\Omega_u=1$ sr; f=80%; and the field-of-view diameter d on the surface of the earth is 300 m. The expression for the solid angle $\Omega_d$ can be written as $\Omega_d=(\pi d^2/4h^2)$, where h is the altitude of the cloud base from the surface of the earth. The altitude h is equal to the speed of light c multiplied by the time differential divided by two, that is, $h=c\Delta\tau/2$. By substitution of the solid angle equation into the signal return equation, and using these nominal lidar parameters and the cloud and surface feature albedos, the signal returns can be calculated as function of cloud base altitude. The expected range of signal amplitudinal strength for various features are well within current lidar sensing capabilities. The diffuse reflection of a large thick rain cloud can be calculated against various feature, such as, the desert of New Mexico or a polar landscape for best cases, or against passing through a cirrus cloud over the Pacific Ocean for the worst case. All other cases will lie in-between the best and worst cases depending on the cloud formations and the reflective features of the surface of the earth. In the signal shot-noise limit, only a few return counts are required to establish detection. Hence, clouds over desert and polar regions could be detected up to ten kilometers in altitude with the nominal lidar on a single-shot basis. A combination of signal-averaging photon-counting, high power transmitter, a large aperture telescope, and a low orbiting satellite may be necessary to view clouds against darker land expanses and oceans.

In addition to the measurement of cloud bases from space, the lidar system could provide measurement of cloud tops and thickness as collateral cloud measurements. Cloud tops could be observed in the usual way by enhanced Mie scattering. Cloud thickness could be calculated from cloud top measurements taken over a cloud formation. Simple subtraction of the cloud base altitude from the conventional Mie scattering cloud top measurements yields the cloud thickness.

The method is used for the detection of cloud bases preferably from space. The method exploits cloud porosity and the diffuse reflectance of surface features of the earth to obtain lidar reflections from the underside of clouds. The measurements of clouds base altitudes up to tem kilometers altitude over much of the surface of the earth is now feasible with current technology. Those skilled in the art can make enhancements, improvements and modifications to the invention, and these enhancements, improvements and modifications may nonetheless fall within the spirit and scope of the following claims.

What is claimed is:

1. A method for determining the altitude of a cloud base above a surface portion of the earth, the method comprising the steps of, generating an optical pulse directed towards the surface, the optical pulse reflecting off the surface providing a first reflection, the first reflection having a first portion being reflected as earth surface returns and a second portion being reflected towards the cloud base then providing a second reflection reflecting the second portion back towards the surface then providing a third reflection reflecting the second portion as cloud base returns, first receiving at a first time the earth surface returns, second receiving at a second time the cloud base returns, and computing the altitude of the cloud base from a difference between the first time and the second time.

2. The method of claim 1 wherein, the generating, first receiving, second receiving and computing steps are repeated a plurality of time for providing a plurality of cloud base altitudes, the method further comprising the step of, averaging the plurality of cloud base altitudes from the repeated computing step to provide an average altitude of the cloud base.

3. The method of claim 1 further comprising the steps of, generating at a third time a second optical pulse propagating towards a top of the cloud then reflecting the second optical pulse as cloud top returns, receiving the cloud top returns at a forth time computing the altitude of the top of the cloud from a difference between the third time and forth time, and determining a thickness of the cloud by subtracting the altitude of the base of the cloud from the altitude of the top of the cloud.

* * * * *